Jan. 14, 1941.          W. H. LAWRENCE            2,228,275
       HANDLE FOR ONE-HAND AGRICULTURAL CUTTERS AND TROWEL
                       Filed Aug. 27, 1938
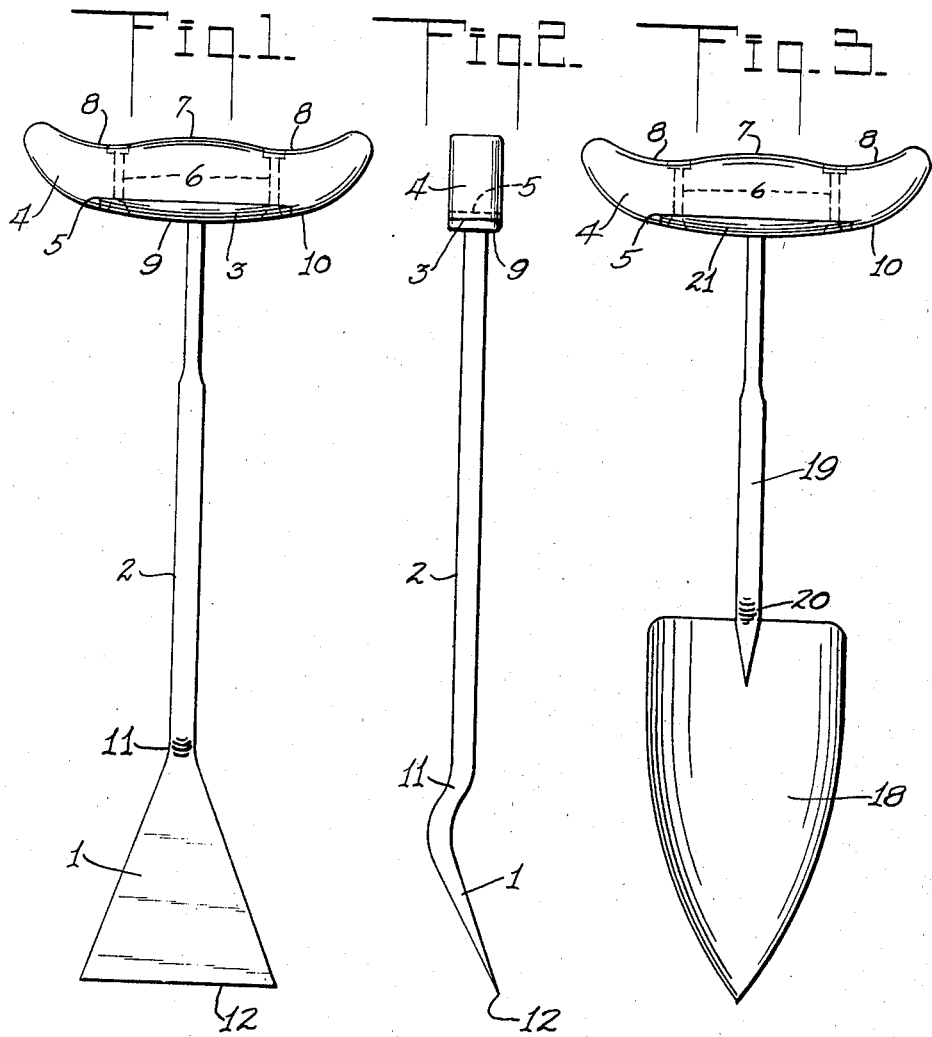
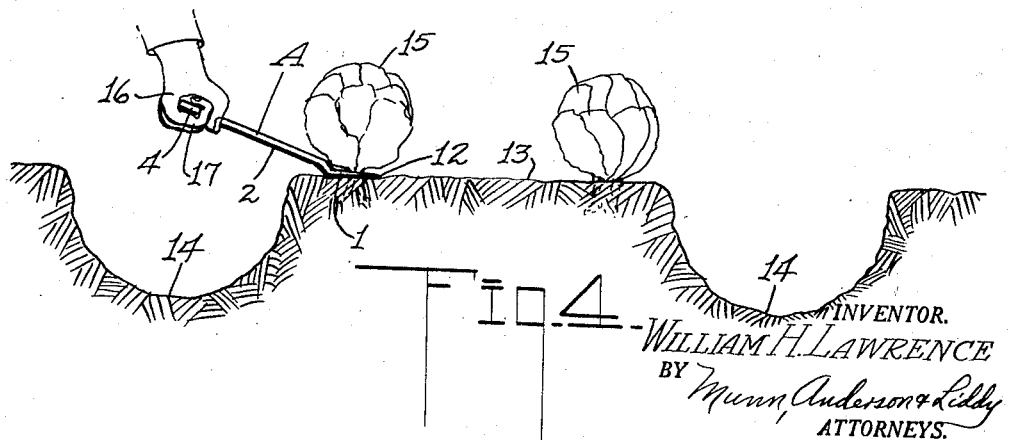
INVENTOR.
WILLIAM H. LAWRENCE
BY Munn, Anderson & Liddy
ATTORNEYS.

Patented Jan. 14, 1941

2,228,275

UNITED STATES PATENT OFFICE 2,228,275

HANDLE FOR ONE-HAND AGRICULTURAL CUTTERS AND TROWEL

William Henry Lawrence, Watsonville, Calif.

Application August 27, 1938, Serial No. 227,134

1 Claim. (Cl. 294—57)

My invention relates to improvements in a handle for one-hand agricultural cutters and trowel, and it consists of the combinations, constructions and arrangements hereinafter described and claimed.

In the cutting of lettuce, asparagus or celery, a small hand cutter is used and the operator uses the tool with only one hand. The tool has a wedge-shaped cutting blade and a straight shank which constitutes the handle of the tool. In the cutting of lettuce, the worker walks along an irrigation ditch bordering a row of lettuce and then with one hand forces the wedge-shaped cutting end of the tool against the roots to sever the head. The wedge-shaped cutting end is moved along the surface of the ground to accomplish this. The end of the shank of the standard tool, is rounded and this bears against the palm of the worker's hand in order to gain sufficient force to cut the lettuce or other article. In a short time the rounded end of the shank pains the hand because it bears against a nerve center in the palm of the hand, and this nerve center receives the shock from the tool when cutting the hard roots or striking the hard soil. The gouging of the end of the shank into the nerve center of the palm, not only makes it ache, but the hand becomes blistered and the operator frequently has to lay off work in order to permit the hand to heal.

The principal object of my invention, is to provide a handle for such a one-hand tool that is shaped to conform to the palm of the hand and to extend entirely across the width of the hand. The handle forms a T with the shank of the tool and the fingers of the operator can freely pass around the handle. The operator may change the position of the fingers so that the shank will project from between the middle two fingers or from between any of the other two fingers. The tool can be guided by one of the fingers engaging with the tool shank and does not require the use of two hands to operate it.

A further object of my invention is to provide a device of the type described which is extremely simple in construction and is durable and efficient for the purpose intended.

Other objects and advantages will appear in the following specification, and the novel features of the device will be particularly pointed out in the appended claim.

My invention is illustrated in the accompanying drawing forming a part of this application, in which—

Figure 1 is a front elevation of the device shown as a cutter;

Figure 2 is a side elevation of Figure 1;

Figure 3 is a front elevation, showing the device as a transplanting tool; and

Figure 4 illustrates how the tool handle is gripped when cutting lettuce.

In carrying out my invention, I provide a one-hand tool known in the trade as a cutter and this cutter has a wedge-shaped cutting end 1, an integral shank 2, and an integral cross bar 3 disposed at the free end of the shank. A handle 4 has a recess 5 designed to receive the cross bar 3. Bolts or rivets 6 are used for permanently securing the handle to the cross bar.

The handle has a round back portion 7 designed to be received in the center of the palm of the hand and the handle is also provided with concave portions 8 that receive the side portions of the hand. The cross bar 3 is curved at 9 and conforms in contour to the curved front portion 10 of the handle.

From the foregoing description of the various parts of the device, the operation thereof may be readily understood.

In using the device, shown in Figures 1 and 2, the handle is placed in the palm of the hand with the curved portion 7 resting in the center of the palm. Normally two fingers of the hand are placed on each side of the shank when the handle is gripped and the thumb extends over the fingers in the manner shown in Figure 4. In Figure 2, I show the shank 2 curved slightly at 11 and I further show the wedge-shaped cutter 1 extending at an angle to the shank axis and tapering down to a cutting edge 12.

The tool is small and is held in one hand rather than in two hands, and in this respect it differs radically from a shovel or another type of tool designed to be used with two hands and forced into the ground with the foot. In the growing of lettuce, it is customary to plant two rows on a ridge and to separate the ridges by gutters which act as irrigation ditches. The ridges are usually 24" wide and the gutters are 12" to 14" wide, and approximately 6" to 8" deep. In Figure 4, I show a ridge 13 bounded by two gutters 14 and I further show two heads of lettuce 15, each representing a row. The cutting tool shown at A in Figure 4 is grasped in only one hand 16 and the fingers 17 are shown extending around the handle 4 in a manner already described. The bend 11 in the handle or shank permits the shank 2 to extend at a slight angle to the horizontal when the wedge-shaped blade 1 of the cutter lies substantially horizontal on the surface of the ground.

The operator in cutting the lettuce, walks along the ditch and places the blade 1 adjacent to the ground with the cutting edge 12 facing the lettuce roots and then forces the blade through the roots, giving the handle a slight rotative twist after severing the lettuce head which causes the head to roll slightly to one side. Since the handle smoothly and uniformly contacts with the entire width of the hand, the force of the blow is distributed over the entire hand area, rather than at one concentrated place in the palm of the hand as is true in the standard tool where the end of the shank bears against only the palm of the hand. From actual experience I have found that four or five times the driving force can be delivered with this tool as with a standard one. No blisters and aching of the hand results because the force of the blow is distributed across the entire width of the hand. The operator can use one of his fingers for pressing against the shank 2 in guiding the shank and the cutting edge 12 into the proper position. The device is far more restful in the hand than is a standard tool and the operator can do more work in a given length of time and do it more efficiently.

The same handle may be used with a transplanting trowel shown in Figure 3. The spade-like end 18 of the trowel is carried by a shank 19 that has a curved portion 20 similar to the bent or curved portion 11. A cross bar 21 integral with the shank 19 is secured to a handle 4 similar in construction to the handle 4 shown in Figures 1 and 2. Corresponding reference numerals are therefore given to similar portions of the handle.

In the transplanting tool, the handle is grasped in the same manner as in the cutting tool, and the spade is driven vertically into the the ground several times for loosening the dirt and then for making the hole that will receive the plant. This type of tool may be used for transplanting cauliflower, cabbages, and all kinds of nursery plants.

The purpose of the handle is to relieve pain, permit a greater force to be exerted on the tool, and to permit proper manipulation of the tool with the same hand that supports it. The handle permits the tool to be readily carried in the hand without effort.

While I have shown only the preferred form of my invention, it should be understood that various changes or modifications may be made within the scope of the appended claim without departing from the spirit of the invention.

I claim:

A T-handle for a short, single-hand wieldable earth-working implement comprising a flat sided grip having a convex top center to occupy the cavity of the palm and having lateral top concavities to receive the lateral lobes of the palm, the underside of the grip being only slightly rounded upwardly and outwardly to afford approximately level rests for the fingers of the hand excepting the mid finger encircling said grip and establishing finger-ball contact with one of the flat sides, and a shank centrally projecting from the grip, being slender relatively to the thickness of the grip, thus to easily occupy the mid finger-space of the hand and provide for the outstretching of said mid finger for contact behind said shank and the exercise of pressure therethrough for the guidance of the implement in use.

WILLIAM HENRY LAWRENCE.